United States Patent [19]

Sioui et al.

[11] 4,184,854

[45] Jan. 22, 1980

[54] MAGNETIC CORES FOR DIAMOND OR CUBIC BORON NITRIDE GRINDING WHEELS

[75] Inventors: Richard H. Sioui, Holden; Edgar B. Carver, Sutton, both of Mass.

[73] Assignee: Norton Company, Worcester, Mass.

[21] Appl. No.: 899,519

[22] Filed: Apr. 24, 1978

[51] Int. Cl.² .............................................. C09K 3/14
[52] U.S. Cl. .............................................. 51/298; 51/309
[58] Field of Search ........................ 51/298, 295, 309

[56] References Cited

U.S. PATENT DOCUMENTS

| | | | |
|---|---|---|---|
| 2,150,886 | 3/1939 | Pyl | 51/298 |
| 3,389,117 | 6/1968 | Kozdemba et al. | 51/298 |
| 3,471,276 | 10/1969 | Bragaw | 51/298 |
| 3,868,233 | 2/1975 | Carver et al. | 51/298 |
| 4,042,347 | 8/1977 | Sioui | 51/298 |

*Primary Examiner*—Donald J. Arnold
*Attorney, Agent, or Firm*—Rufus M. Franklin

[57] ABSTRACT

Iron or other magnetic metal powder is incorporated with aluminum in the core of a diamond or boron nitride grinding wheel. In addition to providing such characteristics as satisfactory bonding ability, strength, thermal expansion, thermal conductivity and turning characteristics, such cores are better held on a magnetic chuck for the performance of finishing operations.

4 Claims, No Drawings

MAGNETIC CORES FOR DIAMOND OR CUBIC BORON NITRIDE GRINDING WHEELS

BACKGROUND OF THE INVENTION

This invention relates to grinding wheels containing the high cost premium abrasives: diamond, or cubic boron nitride. It is conventional to construct such wheels in the form an annular section of bonding matrix containing the abrasive, mounted on a central hub or core portion which does not include any of the premium abrasive. It is well known that it is desirable that the core have relatively high thermal conductivity to conduct heat away from the grinding section, good adhesion to the abrasive section, and adequate strength to withstand the grinding forces and the centrifugal forces caused by rotation of the wheel. In addition, and also well known, the core portion must have thermal expansion properties consistent with the thermal expansion properties of the abrasive section, and it must be machineable, grindable, and "dressable" to satisfy the practical requirements of wheel manufacture and use, it being desirable to machine or drill the core for mounting, the grind it to (for example) maintain parallelism between its sides, and to dress it during grinding use by an abrasive dressing stick. It should also be capable of forming a strong bond to the grinding section.

A common type of material for use in making cores is a phenolic resin with a large amount of aluminum powder filler, as taught by U.S. Pat. No. 2,150,886 to Van Der Pyl. In U.S. Pat. No. 3,389,117, the addition of up to 30 weight % of iron powder, or other metal as an alloying element, based on the total weight of the aluminum alloy, is suggested. The metal addition is alleged to improve the dressability of the core, without decreasing its strength or thermal properties, so long as at least 20% by weight of the core is resin. U.S. Pat. No. 4,042,346 teaches substituting another thermosetting resin for a portion of the phenolic resin in an aluminum filled resinous core. It also teaches the use of graphite in the composition as an aid in dressing. British Pat. No. 1,364,178 teaches the simultaneous hot pressing of a diamond rim section, bonded with the high temperature polyimide resin, processable at 350° to 550° C., and an aluminum powder core section. The core section is sintered metal, not metal filled resin.

U.S. Pat. No. 4,042,347, to Richard H. Sioui, teaches making an abrasive section bond of resin and metal, where the processing temperature is high enough such that the metal powder in the mix sinters to form a metal skeleton, and the resin cures to form a resin skeleton in the matrix.

The present invention relates to a composite aluminum-resin core, containing a relatively large amount of a magnetic metal, to provide a core having desirable physical properties and having the ability to be held on a magnetic chuck for finishing operations after completion of the molding of the wheel.

The resin-metal composite of the present invention is processed at such a temperature that the aluminum powder sinters, resulting in a core having additional strength above that provided by the resin bond. Alternatively, powdered zinc or tin may be substituted for the resin, to give an all metal bond.

SUMMARY OF THE INVENTION

Good adhesion of the abrasive section to the core and a combination of desirable properties in the core member for premium abrasive wheels is achieved by molding the core member and rim simultaneously at relatively high temperature, wherein the core member includes a powdered bonding ingredient in the amount of 5 to 25% by volume, aluminum powder in the amount of 35 to 75% by volume, and powdered magnetic metal (iron, nickel, cobalt, or a magnetic alloy alnico) in the amount of 20 to 40% by volume. Where the abrasive rim is resin bonded, we prefer to use the same resin as the bonding ingredient in the core. A preferred resin is a high temperature addition cured resin such as Ciba Geigy P13N, Gulf Thermid 600, which are imide oligomers having unsaturated group terminated oligimide groups. Upon cure by heat, a cross linked polymer of high molecular weight is produced. Other polymers such as phenol-aldehyde resins, capable of being cured without objectionable decomposition above 200° C. may also be used. Suitable resins which may or may not be cross linked, but which do not melt upon heating to 250° C. are polyimide resins (such as disclosed in British Pat. No. 1,364,178), polyphenylene sulfides and polybenzimidazole resins. Zinc or tin metal may also be substituted for the resin.

Although we define our invention in terms of volume %'s of the ingredients in the core, when resins (specific gravity of about 1.3) are used, and when iron, nickel, or cobalt is used as the magnetic metal, the weight % of resin is 1 to 8%, iron 43 to 72%, and aluminum 20 to 55%.

While the rim and core must be cured simultaneously to achieve the objectives of our invention, it may be desirable, depending on the geometry of the desired wheel, to produce a partially cured or uncured pressed pre-form of either the rim or the core prior to assembly and hot pressing of the composite rim and core.

SPECIFIC EMBODIMENT

The following is a typical mix composition for making the core members in wheels of the present invention:

| Ingredient | Specific Gravity | Volume % | Weight % |
|---|---|---|---|
| Iron powder | 7.9 | 30 | 57.4 |
| Aluminum powder | 2.7 | 60 | 39.4 |
| Polymide resin pre-polymer (Gulf Chemical Co. Thermid HR600) | 1.3 | 10 | 3.2 |

The above resinous core is employed typically in making a wheel in which the same resin is employed as the bond in the diamond section, thus ensuring a good bond between the rim and the core.

Where the hydrid bond of metal and resin is employed in the diamond (or boron nitride) grinding section, the composition of the core mix may be as follows:

| Ingredient | Specific Gravity | Volume % | Weight % |
|---|---|---|---|
| Iron powder | 7.9 | 30 | 50.4 |
| Aluminum powder | 2.7 | 60 | 34.5 |
| Zinc powder | 7.1 | 10 | 15.1 |

Cores which contain less than 20% by volume of iron are not adequately magnetic for holding on a conventional magnetic chuck or holder; over 30% iron deleteriously affects the strength of the cores.

In making a grinding tool, such as a cup type wheel, a cold pressed preform of the core material is desirably first produced, placed in a mold, and the diamond or cubic boron nitride grinding section mix is then put in place and the wheel is hot pressed to essentially theoretical density, at a temperature above 250° C., the specific temperature depending on the composition.

A typical diamond section mix bonded with polyimide bond is as follows:

| | | |
|---|---|---|
| 150 grit, copper or nickel clad | (~56 wt% coating) | 35 vol.% |
| silicon carbide filler | (finer than 315 mesh) | 25 vol.% |
| Gulf Thermid HR600 | (as described above) | 40 vol.% |

The core preform and the diamond section are placed together in an appropriate mold and placed in a press which has been preheated to 360° C. After the mold has reached 200° C., a pressure of 3 to 5 tons per square inch is applied. This pressre is maintained as the mold is heated to 300° C. and then cooled to within 130° C. of room temperature before releasing the pressure and removing the wheel from the mold.

Diamond sections may be bonded with phenolic resin, or with resin metal mixes, as disclosed in U.S. Pat. No. 4,042,347, or polyimide resins as disclosed in British Pat. No. 1,364,178. Also, all metal bonds may be used in U.S. Pat. No. 3,925,035. Where the abrasive section contains zinc or tin, it is desirable that the core include a metal bonding powder such as zinc or tin as in the example above. Hydrid bonded abrasive sections may employ either type of core mix.

In finishing the resulting wheels, the sides for example, may be ground parallel while the wheel is held on a magnetic chuck. Where additional support beyond that provided by the magnetism of the core is required, magnetic holding parts may also be employed.

What is claimed is:

1. A grinding wheel comprising a grinding annulus containing diamond or cubic boron nitride abrasive particles in a bonding matrix said annulus supported on a central hub comprising hot pressed aluminum powder, characterized in that the aluminum hub includes from 5 to 25% by volume of a bonding aid selected from the group consisting of resin, tin and zinc and from 20 to 40% by volume of a magnetic metal powder.

2. A grinding wheel as in claim 1 in which the bonding aid is a resin, corresponding to the composition of the bonding mix in the grinding annulus.

3. A grinding wheel as in claim 1 in which the bonding matrix is a polymer of an imide oligomer containing unsaturated terminal groups.

4. A grinding wheel as in claim 3 in which the grinding section is metal bonded and the core bonding aid is selected from the group consisting tin and zinc.

* * * * *